Patented Aug. 28, 1923.

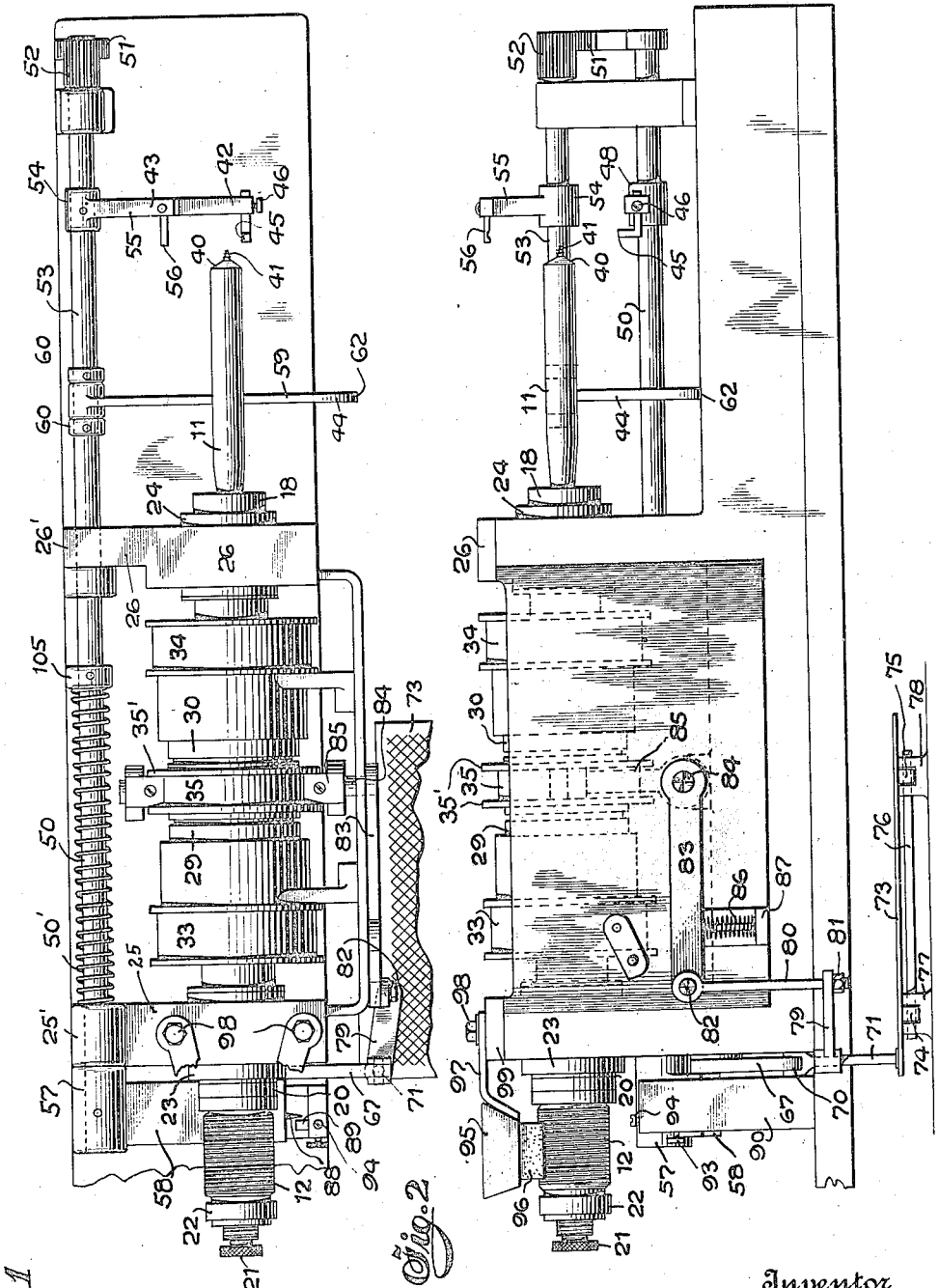

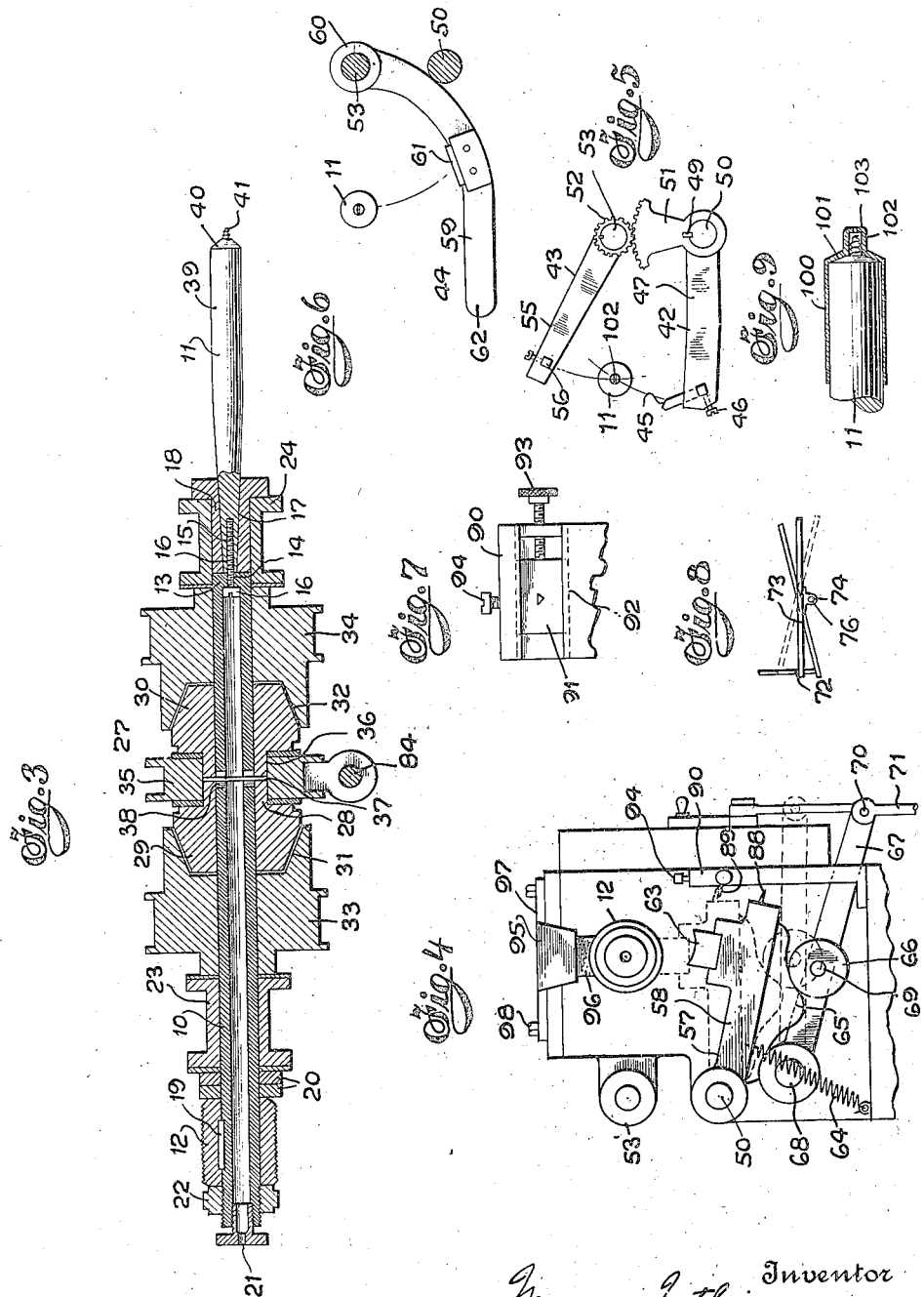

1,466,439

UNITED STATES PATENT OFFICE.

MAGNUS NOTHEIS, OF NORTH BERGEN, NEW JERSEY, ASSIGNOR, BY MESNE ASSIGN-MENTS, TO WHITE METAL MANUFACTURING COMPANY, OF JERSEY CITY, NEW JERSEY, A CORPORATION OF NEW JERSEY.

FINISHING MACHINE FOR TUBES AND THE LIKE.

Application filed January 17, 1919. Serial No. 271,578.

*To all whom it may concern:*

Be it known that I, MAGNUS NOTHEIS, a citizen of Germany, and a resident of the town of North Bergen, Hudson County, State of New Jersey, have invented an Improvement in Finishing Machines for Tubes and the Like, of which the following is a specification.

My invention relates to apparatus for finishing tubes and the like, more particularly collapsible tubes, such as are used for containing tooth paste and similar material of a plastic nature. The object of my invention is to provide apparatus of the general character specified in which the various desired operations are efficiently and rapidly carried out, which apparatus shall be simple and economical in construction, and certain in operation.

By way of example, I have shown a preferred embodiment of my invention in the accompanying drawings, wherein:

Figure 1 is a plan view of such embodiment;

Figure 2 is a side elevation of the same;

Figure 3 is a longitudinal cross-section of the clutch mechanism and associated parts;

Figure 4 is an elevational view of one end of such embodiment;

Figure 5 is a similar view, partly diagrammatic, of the other end of such embodiment;

Figures 6, 7, 8, and 9 are detail views, partly diagrammatic, of various portions of the device.

Referring to the illustrative embodiment here shown for purposes of illustration only, the apparatus comprises a shaft 10, preferably hollow, carrying at one end thereof a work-supporting spindle 11, and at the other end a threaded sleeve 12.

The shaft 10, which, as has been stated, is preferably hollow, is provided at the spindle-carrying end of the same with the perforated collar 13. Passing through the perforation 14 of the collar 13 is a screw, or similar fastening device 15, the head 16 of which bears against the inner face of the collar 13. The threaded end of the screw 15 enters a correspondingly threaded recess 16 within the tapered end 17 of the spindle 11. Co-operating with said tapered end of the spindle is a sleeve or bushing 18 which is internally tapered to co-operate with and position the tapered end 17 of the spindle 11.

The threaded sleeve 12 is keyed to the other end of shaft 10, as indicated at 19. The usual washers 20 and oil port 21 are provided. At 22 is also shown an adjustable collar for properly positioning parts 12 and 20 on shaft 10.

The shaft 10 rotates within a pair of bearing sleeves 23 and 24 which are carried by the standards 25 and 26, respectively. Also mounted on shaft 10 is a clutch generally designated by reference character 27, and comprising a reciprocatable member 28, having the friction cones 29 and 30 at opposite ends thereof, for engagement with the inner conical friction surfaces 31 and 32 of the pulleys 33 and 34, respectively.

The pulleys 33 and 34 ride loosely on shaft 10 and are driven in opposite directions by any suitable mechanism, such as belts, not here shown. Member 28 is capable of sufficient reciprocating movement along shaft 10 to enable it and cones 29 and 30 carried thereby alternately and at predetermined times to engage the friction surfaces of either pulley 33 or pulley 34. Provision for such reciprocating movement of member 28 is made by providing a collar 35 which is seated within the recess 36 of the member 28. The collar 35 is attached to member 28 and to shaft 10 so as to cause parts 28 and 35 to rotate with shaft 10, as by means of a pin 37, shaft 10 being slotted as indicated at 38 to enable member 28 and pin 37 to have the necessary play along said shaft.

The spindle 11 which, as shown, is readily removable from shaft 10, consists, in addition to the tapered portion 17 already described, of a cylindrical portion 39 and a conical or tapered end portion 40 which carries a threaded projection 41 for a purpose subsequently to be described.

The machine is preferably provided with a plurality of finishing tools, such as a threading tool generally indicated by reference character 42, a trimming tool generally indicated by reference character 43, and a cutting tool generally indicated by reference character 44. The threading tool 42, more clearly shown in Figure 5, comprises a thread-cutting knife or member 45, which is removably attached, as by means of the binding screw 46, to an arm 47 carried by a sleeve 48, keyed, as by means of the key 49, to a rocking shaft 50. The sleeve 48 also preferably carries a segmental toothed gear 51 for engagement with a pinion 52 keyed to the rocking countershaft 53. Shaft 53, which is carried by suitable bearings 53' attached to any suitable portion of the machine frame, carries sleeve 54 to which is attached an arm 55 carrying the trimming knife 56 forming part of the trimming tool 43.

The rocking shaft 50 is mounted in bearings suitably disposed and supported on the frame of the machine, as by being supported in the ends 25' and 26' of standards 25 and 26, respectively. At one end, the shaft 50 carries the block 57 to which is attached the rocking arm 58. At its other end, the rod 50 carries the sleeve 48, keyed thereto as already described. Pinion 52 is made sufficiently long so that segmental gear 51 carried by shaft 50 may reciprocate a substantial distance with respect to pinion 52 for a purpose subsequently to be set forth.

The cutting tool 44 comprises an arcuate arm 59 loosely pivoted to the rocking countershaft 53 between collars 60 fixed on said countershaft. The arm 59 carries a knife or cutting member 61. In the lower or inoperative position of cutting member 44, arm 59 rests against shaft 50. In the upper or operative position of the cutting member 44, said member 44 is raised manually by manipulating the handle on free end 62 of member 44 so as to bring the knife 61 by a pivotal movement into operative position.

Arm 58, which is attached to block 57, which in turn is carried by shaft 50 so as to oscillate and reciprocate with said shaft, carries at its outer end the threaded block 63 for engagement with the threaded sleeve 12 carried by shaft 10. The threaded block 63 is held by gravity and by means of the tension spring 64 in inoperative or lower position, as shown in full lines in Figure 4.

The block 63 is raised into operative position by means of a cam 65 carried by arm 58, which cam may be acted upon by the roller 66 carried by the arm 67 pivoted as at 68 to any suitable portion of the machine frame. The roller 66 is pivoted to the arm 67 as at 69. Arm 67 is preferably pedal operated. For this purpose the free end of arm 67 is pivoted as at 70 to a link 71, the lower end of which is pivoted as at 72 to a pedal 73, which is in turn pivoted at 74 and 75 to a rod 76 suitably borne by the standards 77 and 78.

The various positions which the pedal may assume are diagrammatically illustrated in Figure 8. The neutral position of the pedal is indicated as being substantially horizontal, and corresponds to the inoperative position of the block 63 with respect to sleeve 12, and to the disengagement of the cones 29 and 30 from the pulleys 33 and 34; the oblique position, shown in dotted lines, corresponds to the position in which threaded block 63 will engage threaded pulley 12, and in which shaft 10 will rotate in one direction; the oblique position indicated in full lines corresponds to the position in which block 63 does not engage pulley 12, and in which the shaft 10 will rotate in the opposite direction.

The link 71 is provided with a perforated or slotted arm or extension 79 through which passes the link 80, the normal or neutral relative position between said link and arm 79 being maintained by any suitable means, such as the nut 81 adjustably positioned adjacent one end of link 80 and engaging the slotted or perforated end of arm 79. Link 80 is pivotally connected, as at 82, to one arm of a bell crank lever 83 pivoted at 84 to any suitable portion of the machine frame. The other arm 85 of this lever is in the form of a fork-shaped or arcuate member which engages member 35 within flanges 35' of the same. The spring 86, which may be adjusted by providing an adjustable abutment 87, tends to raise one end of the arm 83 to thereby bring friction cone 30 into engagement with the friction surface 32 of pulley 34. The cone 30 is, however, normally kept out of contact with friction surface 32 by means of the engagement of bolt 81 with arm 79 in the normal or neutral position of the pedal 73, in which position neither friction cone is in contact with the friction surface of its corresponding pulley.

The arm 58, carrying the threaded member 63, is provided with a projection 88 which is designed and adapted to cooperate with a ledge-like projection or abutment 89. This abutment is adjustably supported in any suitable portion of the machine frame, as in part 90. For this purpose the abutment 89 is carried by a bar or slug 91 positioned in a slideway 92 in part 90. Any suitable manipulating device 93 is provided in the free end of bar 91 to enable the bar 91 and its associated abutment 89 to be readily handled. Bar 91 and abutment 89 carried thereby may be retained in adjusted position by means of the set screw 94 passing through part 90 in slideway 92 for engagement with bar 91. If desired, as shown, the threaded sleeve may be provided with an oil-feeding receptacle 95, the bottom of the receptacle being slotted to admit wicks of felt or the like, indicated at 96, which serve to supply oil to the threaded pulley 12. Receptacle 95 may be suitably supported as on an arm 97 attached by a bolt or other fastening device 98 to any suitable portion of the machine frame, as part 99.

The operation of the machine will be substantially clear from the foregoing description. The work, comprising, for example, a die-molded collapsible tube of generally cylindrical form, indicated by reference character 100, having a sloping shoulder 101, and a projecting orificed nipple 102, the orifice being in an integral end cap or closure 103, is placed on the spindle 11. As already indicated, spindle 11 is normally at rest. The operator pushes the tube along the spindle until the threaded end 41 of said spindle enters and engages the inner face of nipple 102. The purpose of providing the threaded end 41 on spindle 11 is so that the tube 100 may be firmly retained and held in place during the various operations to which it is subjected in the machine. The threads on projection 41 are rounded rather sharp, and are of steep pitch, so as not to injure the nipple of the tube in any way.

The operator now depresses the forward end of pedal 73 so as to raise link 71 and arm 79 carried thereby. Arm 79, as already stated, is slotted or apertured so as to permit free passage of link 80 therethrough. The first effect of this operation is to permit spring 86 to rock arm 85 so as to bring friction cone 30 into frictional engaging contact with surface 32 of pulley 34, thereby causing spindle 11 to be rotated.

The continued depression of the forward end of the pedal 73, and the consequent elevation of link 71, act to raise arm 67 carrying the roller 66 against gravity and against the tension of spring 64. Roller 66 is thus brought to bear against cam 65 which is attached to arm 58 carrying the threaded block 63. This serves to bring threaded block 63 into operative engagement with the rotating threaded sleeve 12. At the same time, the pivotal movement of arm 58 carrying threaded block 63, by reason of the engagement of roller 66 with cam 65, rocks or oscillates shaft 50 carrying the threading tool 42 and the segmental gear 51. This last operation brings the threading cutter 45 of the threading tool 42 into operative engagement with the work, and by the engagement of segmental gear 51 with pinion 53 serves also and simultaneously to bring the trimming cutter 56 of the trimming tool 43 into operative engagement with the work.

The engagement between threaded block 63 and threaded part 12 acts to move said block, and the arm 58, member 57, rod 50, threading tool 42, and the segmental gear 51, outwardly away from end 25' of standard 25, against the action of a compression spring 50' which surrounds rod 50 and extends between a collar 105, keyed or otherwise fixed to said rod 50, and said part 25'.

At this stage of the operation of the machine, the threading cutter 45 engages and travels along the nipple 102, the nipple and its associated tube being constantly rotated on the spindle 11 in the direction already indicated for this part of the operation. Nipple 102 is thus threaded. The end trimming tool 43, which is, unlike the threading tool 42, longitudinally fixed in position with respect to spindle 11 and the work 100 carried thereby, serves to trim the end closure cap 103 of the tube 100.

At the same time, the operator manually raises the cutting tool 44 to bring the knife 61 thereof into engagement with the uneven end of tube 100 so as to even and cut the same off at a predetermined distance from the shoulder 101, as indicated at 104. The finished tube will therefore be of predetermined and even length throughout.

The operator maintains the pedal with its forward end in depressed position, as above indicated, until the projection 88 on arm 58 carrying the threaded block 63 rides over and rests upon the ledge or abutment 89, the degree of elevation of the block 63 resulting from the operation of the pedal in the manner set forth above being sufficient to maintain said block in raised position with the lower face of member 88 slightly above or substantially on a level with the upper face of member 89. The width of the roller 66 is such, as made more clear hereinafter, as to cause it to maintain block 63 in raised or elevated position in engagement with the threaded sleeve 12 in which position member 88 is over and above or resting upon member 89, and is sufficiently small to permit block 63 to fall or drop out of engagement with threaded sleeve 12 after member 88 is no longer over or on member 89. The block 63 is thus maintained in operative engagement with the threaded sleeve 12, since said block will be kept in elevated position as long as the projection 88 rests upon and rides along the adjustable abutment or ledge 89.

As the threaded block 63 and the parts associated therewith continue to move outwardly, corresponding to the threading and trimming operations described above, a point in the operation of the machine will be reached when the projection 88 will move clear away from the ledge or abutment 89. Arm 58, carrying the threaded block 63, will, under the action of gravity and of the tension of spring 64, drop away from threaded sleeve 12, the pedal being now still slightly depressed sufficiently to keep the spindle rotating, roller 66 being sufficiently narrow to permit this downward movement of block 63 even if the pedal 73 is kept in depressed position at this stage of operation.

Arm 58, carrying block 63 and its associated parts, all carried and supported by rod 50, will therefore be returned to the initial position set forth above by the action of spring 50'. The dropping of arm 58 to its lower or non-engaging position oscillates tools 42 and 43 to their original inoperative position with respect to spindle 11 and the work 100 carried thereby. As previously stated, the pinion 52 is long enough to permit the necessary relative longitudinal movement between tool 43 and spindle 11. It will thus be noted that while tool 42 and spindle 11 are capable of relative longitudinal movement, neither tool 43 nor tool 44 is capable of such movement with respect to spindle 11 and the work carried thereby.

In order to readily disengage the work from the spindle 11 and its threaded binding projection 41, the operator first releases the pressure on the forward end of pedal to bring spindle 11 to rest and then depresses the rear end of pedal 73, to thereby depress link 71 and arm 79 carried thereby. Arm 71, in its downward movement, by abutting against nut 81, will depress link 80 to thereby rock or oscillate arms 83 and 85 of the bell crank lever against the action of spring 86 to bring friction cone 29 into operative engagement with friction surface 31 of pulley 33. This action will serve to rotate spindle 11 and the work, such as the tube 100, carried thereby, in a direction reverse to its previous direction of rotation. This reversal of direction of rotation is due to the opposite directions of rotation of pulleys 33 and 34, as already set forth. This reversal of direction of rotation of spindle 11 acts by the inertia of tube 100 and by the engagement of the hand of the operator with said tube to disengage the threaded projection 41 from the inner surface of the nipple 102, and the finished tube 100 may therefore be readily removed from spindle 11. The operator then releases pedal 73 which returns to its neutral or horizontal position, with the spindle at rest, and the series of operations described above may now be repeated.

It is of course to be understood that my invention is not to be limited to the specific form thereof herein shown and described for purpose of illustration only.

What I claim is:

1. In a machine for finishing collapsible tubes and the like, a shaft, a spindle carried by said shaft, means for rotating said shaft and the spindle carried thereby, an oscillatable rod, a plurality of trimming tools associated with said rod, and means for oscillating said rod to bring said tools simultaneously into or out of operative relation to said spindle and the work carried thereby.

2. In a machine for finishing collapsible tubes and the like, a shaft, a spindle carried by said shaft, means for rotating said shaft and the spindle carried thereby, an oscillatable rod, a plurality of longitudinally relatively movable trimming tools associated with said rod, and means for oscillating said rod to bring said tools simultaneously into or out of operative relation to said spindle and the work carried thereby.

3. In a machine for finishing collapsible tubes and the like, a shaft, a spindle carried by said shaft, means for rotating said shaft and the spindle carried thereby, an oscillatable rod, a trimming tool carried by said rod intermediate its ends, a segmental gear carried by said rod at one end thereof, a second trimming tool carried by a countershaft, a gear carried by said countershaft for engagement with said segmental gear, and means acting on said rod at the other end thereof for oscillating said rod to bring said trimming tools into or out of operative relation to said spindle and the work carried thereby.

4. In a machine for finishing collapsible tubes and the like, a shaft, a spindle carried by said shaft, means for rotating said shaft and the spindle carried thereby, an oscillatable rod, a trimming tool carried by said rod intermediate its ends, a segmental gear carried by said rod at one end thereof, a second trimming tool carried by a countershaft, a gear carried by said countershaft for engagement with said segmental gear, and means acting on said rod at the other end thereof for oscillating said rod to bring said trimming tools into or out of operative relation to said spindle and the work carried thereby, said trimming tools being longitudinally relatively movable.

5. In a machine for finishing collapsible tubes and the like, a shaft, a spindle carried by said shaft, means for rotating said shaft and the spindle carried thereby alternately in one and then in the reverse direction, a plurality of trimming tools, and means for bringing said tools simultaneously into or out of operative relation to said spindle and the work carried thereby, said last-mentioned means being operated by the action of said rotating means, the operative and inoperative positions of the trimming tools respectively corresponding to the two directions of rotation of said shaft and the spindle carried thereby.

6. In a machine for finishing collapsible tubes and the like, a shaft, a spindle carried by said shaft, means for rotating said shaft and the spindle carried thereby alternately in one and then in the reverse direction, an oscillatable rod, a plurality of trimming tools associated with said rod, and means for oscillating said rod to bring said tools simultaneously into or out of operative relation to said spindle and the work carried thereby, said last-mentioned means being operated by the action of said rotating means, the operative and inoperative positions of the trimming tools respectively corresponding to the two directions of rotation of said shaft and the spindle carried thereby.

7. In a machine for finishing collapsible tubes and the like, a shaft, a spindle carried by said shaft, means for rotating said shaft and the spindle carried thereby alternately in one and then in the reverse direction, a plurality of longitudinally relatively movable trimming tools, and means for bringing said tools simultaneously into or out of operative relation to said spindle and the work carried thereby, said last-mentioned means being operated by the action of said rotating means, the operative and inoperative positions of the trimming tools respectively corresponding to the two directions of rotation of said shaft and the spindle carried thereby.

8. In a machine for finishing collapsible tubes and the like, a shaft, a spindle carried by said shaft, means for rotating said shaft and the spindle carried thereby alternately in one and then in the reverse direction, a plurality of longitudinally relatively movable trimming tools, and means for bringing said tools simultaneously into or out of operative relation to said spindle and the work carried thereby, said last-mentioned means being operated by the action of said rotating means, the operative and inoperative positions of the trimming tools respectively corresponding to the two directions of rotation of said shaft and the spindle carried thereby.

9. In a machine for finishing collapsible tubes and the like, a shaft, a spindle carried by said shaft, means for rotating said shaft and the spindle carried thereby alternately in one and then in the reverse direction, an oscillatable rod, a trimming tool carried by said rod intermediate its ends, a segmental gear carried by said rod at one end thereof, a second trimming tool carried by a countershaft, a gear carried by said countershaft for engagement with said segmental gear, and means acting on said rod at the other end thereof for oscillating said rod to bring said trimming tools into or out of operative relation to said spindle and the work carried thereby, said last-mentioned means being operated by the action of said rotating means, the operative and inoperative positions of the trimming tools respectively corresponding to the two directions of rotation of said shaft and the spindle carried thereby.

10. In a machine for finishing collapsible tubes and the like, a shaft, a spindle carried by said shaft, means for rotating said shaft and the spindle carried thereby alternately in one and then in the reverse direction, an oscillatable rod, a trimming tool carried by said rod intermediate its ends, a segmental gear carried by said rod at one end thereof, a scond trimming tool carried by a countershaft, a gear carried by said countershaft for engagement with said segmental gear, and means acting on said rod at the other end thereof for oscillating said rod to bring said trimming tools into or out of operative relation to said spindle and the work carried thereby, said trimming tools being longitudinally relatively movable, said last mentioned means being operated by the action of said rotating means, the operative and inoperative positions of the trimming tools respectively corresponding to the two directions of rotation of said shaft and the spindle carried thereby.

11. In a machine for finishing collapsible tubes and the like, a shaft, a spindle carried by said shaft, driving means for rotating said shaft and the spindle carried thereby, a finishing tool, a rotatable rod carrying said tool, means for bringing said tool into operative engagement with said spindle and the work carried thereby and for moving said tool a predetermined distance longitudinally of said spindle, and automatically operating means for returning said tool to its original inoperative position.

12. In a machine for finishing collapsible tubes and the like, a shaft, a spindle carried by said shaft, driving means for rotating said shaft and the spindle carried thereby alternately in one and then in the reverse direction, a finishing tool, a rotatable rod carrying said tool, and means for bringing said tool into operative engagement with said spindle and the work carried thereby and for moving said tool a predetermined distance longitudinally of said spindle.

13. In a machine for finishing collapsible tubes and the like, a shaft, a spindle carried by said shaft, driving means for rotating said shaft and the spindle carried thereby alternately in one and then in the reverse direction, a finishing tool, a rotatable rod carrying said tool, means for bringing said tool into operative engagement with said spindle and the work carried thereby and for moving said tool a predetermined distance longitudinally of said spindle, and automatically operating means for returning said tool to its original inoperative position.

14. In a machine for finishing collapsible tubes and the like, a shaft, a spindle carried by said shaft, driving means for rotating said shaft and the spindle carried thereby, a finishing tool, a rotatable rod carrying said tool, means associated with and operated by said driving means for bringing said tool into operative engagement with said spindle and the work carried thereby and for moving said tool a predetermined distance longitudinally of said spindle, and automatically operating means for returning said tool to its original inoperative position.

15. In a machine for finishing collapsible tubes and the like, a shaft, a spindle carried by said shaft, driving means for rotating said shaft and the spindle carried thereby alternately in one and then in the reverse direction, a finishing tool, a rotatable rod carrying said tool, and means associated with and operated by said driving means for bringing said tool into operative engagement with said spindle and the work carried thereby and for moving said tool a predetermined distance longitudinally of said spindle.

16. In a machine for finishing collapsible tubes and the like, a shaft, a spindle carried by said shaft, driving means for rotating said shaft and the spindle carried thereby alternately in one and then in the reverse direction, a finishing tool, a rotatable rod carrying said tool, means associated with and operated by said driving means for bringing said tool into operative engagement with said spindle and the work carried thereby and for moving said tool a predetermined distance longitudinally of said spindle, and automatically operating means for returning said tool to its original inoperative position.

17. In a machine for finishing collapsible tubes and the like, a shaft, a spindle carried by said shaft, driving means for rotating said shaft and the spindle carried thereby alternately in one and then in the reverse direction, a finishing tool, a rotatable rod carrying said tool, means for bringing said tool into operative engagement with said spindle and the work carried thereby and for moving said tool a predetermined distance longitudinally of said spindle, and means for reversing the direction of rotation of said shaft and the spindle carried thereby on said tool being returned to its original inoperative position.

18. In a machine for finishing collapsible tubes and the like, a shaft, a spindle carried by said shaft, driving means for rotating said shaft and the spindle carried thereby alternately in one and then in the reverse direction, a finishing tool, a rotatable rod carrying said tool, means for bringing said tool into operative engagement with said spindle and the work carried thereby and for moving said tool a predetermined distance longitudinally of said spindle, automatically operating means for returning said tool to its original inoperative position, and means for reversing the direction of rotation of said shaft and the spindle carried thereby on said tool being returned to its original inoperative position.

19. In a machine for finishing collapsible tubes and the like, a shaft, a spindle carried by said shaft, driving means for rotating said shaft and the spindle carried thereby alternately in one and then in the reverse direction, a finishing tool, a rotatable rod carrying said tool, means associated with and operated by said driving means for bringing said tool into operative engagement with said spindle and the work carried thereby and for moving said tool a predetermined distance longitudinally of said spindle, and means for reversing the direction of rotation of said shaft and the spindle carried thereby on said tool being returned to its original inoperative position.

20. In a machine for finishing collapsible tubes and the like, a shaft, a spindle carried by said shaft, driving means for rotating said shaft and the spindle carried thereby alternately in one and then in the reverse direction, a finishing tool, a rotatable rod carrying said tool, means associated with and operated by said driving means for bringing said tool into operative engagement with said spindle and the work carried thereby and for moving said tool a predetermined distance longitudinally of said spindle, automatically operating means for returning said tool to its original inoperative position, and means for reversing the direction of rotation of said shaft and the spindle carried thereby on said tool being returned to its original inoperative position.

In testimony whereof, I have signed my name to this specification this 16th day of January, 1919.

MAGNUS NOTHEIS.